United States Patent
Fu et al.

(10) Patent No.: US 12,030,422 B2
(45) Date of Patent: Jul. 9, 2024

(54) INTELLIGENT PARKING LOT AND CLUSTER TRANSFER ROBOT

(71) Applicant: Guangzhou Dabo Intelligent Technology Co., Ltd., Guangdong (CN)

(72) Inventors: Jian Fu, Guangdong (CN); Jianquan Liu, Guangdong (CN); Zhijun Liu, Guangdong (CN); Yongjian Zhan, Guangdong (CN)

(73) Assignee: GUANGZHOU DABO INTELLIGENT TECHNOLOGY CO., LTD., Guangzhou (CN)

( * ) Notice: Subject to any disclaimer, the term of this patent is extended or adjusted under 35 U.S.C. 154(b) by 551 days.

(21) Appl. No.: 17/282,352

(22) PCT Filed: Aug. 6, 2019

(86) PCT No.: PCT/CN2019/099485
§ 371 (c)(1),
(2) Date: Apr. 1, 2021

(87) PCT Pub. No.: WO2020/073728
PCT Pub. Date: Apr. 16, 2020

(65) Prior Publication Data
US 2021/0347290 A1    Nov. 11, 2021

(30) Foreign Application Priority Data
Oct. 12, 2018 (CN) .......................... 201811192230.7

(51) Int. Cl.
*E04H 6/36* (2006.01)
*B60P 3/06* (2006.01)
(Continued)

(52) U.S. Cl.
CPC ............... *B60P 3/077* (2013.01); *B60P 3/064* (2013.01); *E04H 6/24* (2013.01); *E04H 6/36* (2013.01); *E04H 6/424* (2013.01)

(58) Field of Classification Search
CPC .............. E04H 6/424; E04H 6/36; E04H 6/24
See application file for complete search history.

(56) References Cited

U.S. PATENT DOCUMENTS

| | | | |
|---|---|---|---|
| 10,590,669 B2 * | 3/2020 | Boussard | B60P 3/075 |
| 11,021,138 B2 * | 6/2021 | Tzivanopoulos | E04H 6/424 |
| 2013/0251481 A1 * | 9/2013 | Shani | E04H 6/36 |
| | | | 414/231 |

FOREIGN PATENT DOCUMENTS

| | | | |
|---|---|---|---|
| CN | 101915003 A | * | 12/2010 |
| CN | 101915003 A | | 12/2010 |

(Continued)

OTHER PUBLICATIONS

International Search Report of PCT/CN2019/099485.
Written Opinion of PCT/CN2019/099485.

*Primary Examiner* — Minnah L Seoh
*Assistant Examiner* — Hosam Shabara

(57) ABSTRACT

A cluster transfer robot includes a body, two clamping arms arranged at the bottom of the body, and a first driving mechanism arranged at the bottom of the body. The first driving mechanism includes a driving wheel configured for driving the transfer robot to move. The clamping arm includes a second driving mechanism and a rotating assembly connected to the second driving mechanism, the rotating assembly includes a rotating arm rotatably connected to the body and a supporting wheel arranged on the rotating arm for supporting the transfer robot, the rotating arm is provided with a clamping portion for clamping automobile tire, and two clamping portions of two rotating arms are arranged facing to each other to define a clamping space for the (Continued)

automobile tire when the two clamping portions are close to each other. The cluster transfer robot can greatly reduce the construction cost of intelligent parking lots.

16 Claims, 8 Drawing Sheets

(51) Int. Cl.
  *B60P 3/077* (2006.01)
  *E04H 6/24* (2006.01)
  *E04H 6/42* (2006.01)

(56) References Cited

FOREIGN PATENT DOCUMENTS

| | | | |
|---|---|---|---|
| CN | 104746915 | A | 7/2015 |
| CN | 105888338 | A | 8/2016 |
| CN | 106223675 | A | 12/2016 |
| CN | 107288393 | A | 10/2017 |
| CN | 107539738 | A | 1/2018 |
| CN | 207392849 | U | 5/2018 |
| CN | 108166819 | A | 6/2018 |
| CN | 108222602 | A | 6/2018 |
| CN | 108266031 | A | 7/2018 |
| CN | 108331409 | A | 7/2018 |
| CN | 109339535 | A | 2/2019 |
| CN | 209293528 | U | 8/2019 |
| JP | 1997269823 | A | 10/1997 |
| JP | H09269823 | A * | 10/1997 |
| JP | 1997286338 | A | 11/1997 |
| JP | 1999321655 | A | 11/1999 |
| JP | H11321655 | A * | 11/1999 |
| JP | 2004169451 | A | 6/2004 |
| JP | 2010150861 | A | 7/2010 |
| JP | 2010150861 | A * | 7/2010 |
| JP | 2017053082 | A | 3/2017 |
| JP | 2017053082 | A * | 3/2017 |
| JP | 2012188104 | A | 10/2017 |

\* cited by examiner

INTELLIGENT PARKING LOT AND CLUSTER TRANSFER ROBOT

CROSS-REFERENCE TO RELATED APPLICATION

This application is a national stage application of PCT/CN2019/099485. This application claims priorities from PCT Application No. PCT/CN2019/099485, filed Aug. 6, 2019, and Chinese patent application no. 201811192230.7, filed Oct. 12, 2018 the content of which is incorporated herein in the entirety by reference.

FIELD

The present disclosure relates to the field of parking lots, and more particularly to an intelligent parking lot and its cluster transfer robot.

BACKGROUND

Automated Guided Vehicle (AGV) is an important branch of mobile robots. AGV used in industry is also called autonomous unmanned transport vehicle. The autonomous unmanned transport vehicle is widely used in storage, manufacturing, and transportation industry. It is equipped with electromagnetic or optical automatic guiding devices, so that the transport vehicle can be loaded with objects to move along a designed route. The use of AGV improves the transport efficiency of objects, and reduces manual labor. The AGV generally includes an on-board controller, a motion control system, and a positioning and navigation system. When a handling instruction is received, the on-board controller performs calculation and analysis based on an operation map, and the current position and forward direction of the AGV, to determine the best running route; then, the on-board controller controls the AGV to move according to the running route, making the AGV reach a designated position and then stop accurately; finally, objects are transferred to the AGV by transfer mechanisms, and the AGV carries the objects to move to a designated area.

In recent years, with the development of the AGV, a fully automated parking lot has attracted people's attention, which is based on the characteristics of AGV such as right-angle turning and precise positioning. The application of AGV in parking lots allows drivers no longer needing parking the vehicles into the parking lot themselves, but only needing to park the vehicles on a parking platform in a vehicle parking area. A car board and a pit for placing the car board are arranged in the vehicle parking area. After the vehicle is parked on the car board, the AGV moves to the bottom of the car board and lifts the car board a certain height to make the car board separate from the ground, then the car board and the vehicle are moved to a designated parking space by the AGV for parking. When fetching the car, the AGV cooperates with the car board to transfer the vehicle from the parking space to a picking-up area. As such, automatic parking and fetching of the vehicle is realized, which effectively saves the time of vehicle owners.

It can be known from above that, to realize transferring of the vehicle, the traditional AGV needs to cooperate with the car board and depends on a structural remoulding (pit) of the picking-up area of the parking lot. Therefore, if the traditional AGV is applied, the parking lot needs to be modified, and at the same time, a car board matching the AGV should be provided. This will increase the construction cost of the intelligent parking lots, and hinder the development of the smart parking lots.

SUMMARY

Technical Problem

The present disclosure is to provide a cluster transfer robot, to solve the technical problem of high construction cost of the smart parking lots caused by applying the conventional AGV described above.

Technical Solution for Solving the Technical Problem Above is as Follows

A cluster transfer robot includes a body, two clamping arms arranged at the bottom of the body, and a first driving mechanism arranged at the bottom of the body. The first driving mechanism includes a driving wheel configured for driving the transfer robot to move. The clamping arm includes a second driving mechanism and a rotating assembly connected to the second driving mechanism, the rotating assembly includes a rotating arm rotatably connected to the body and a supporting wheel arranged on the rotating arm for supporting the transfer robot, the rotating arm is provided with a clamping portion for clamping automobile tire, and two clamping portions of two rotating arms are arranged facing to each other to define a clamping space for the automobile tire when the two clamping portions are close to each other.

Preferably, the first driving mechanism further includes: a mounting frame including a mounting plate and two supporting portions arranged on the mounting plate face to face, each supporting portion is equipped with the driving wheel, and the two driving wheels are arranged coaxially; a driving assembly including a first drive motor arranged on the supporting portion and a first reducer connected to the output shaft of the first drive motor, the output shaft of the first reducer is connected to the driving wheel; and a steering assembly including a second drive motor arranged on the mounting plate, a second reducer connected to the output shaft of the second drive motor, a driving gear connected to the output shaft of the second reducer, and a slewing bearing meshed with the driving gear; the inner ring of the slewing bearing is connected to the mounting plate, and the outer ring of the slewing bearing is connected to the body.

Preferably, the first driving mechanism further includes a plurality of vibration damping assemblies arranged between the supporting portion and the mounting plate, the vibration damping assembly includes a positioning rod and an elastic member sleeved on the positioning rod for supporting the mounting plate. One end of the positioning rod is fixedly connected to the supporting portion, and the other end is slidably connected to the mounting plate.

Preferably, the first driving mechanism further includes a plurality of guiding assemblies arranged between the supporting portion and the mounting plate, and the guiding assembly includes a guiding rod and a shaft sleeve sleeved on the guiding rod. The shaft sleeve is fixedly connected to the supporting portion, and one end of the guiding rod is fixedly connected to the mounting plate.

Preferably, the driving wheel is a steering wheel including a drive motor and a steering motor.

Preferably, the second driving mechanism includes a third drive motor and a worm gear driving member, the third drive motor is arranged on the body, and the worm of the worm gear driving member is connected with the output shaft of the third drive motor. The worm wheel of the worm gear driving member includes a fixed inner ring and a rotating outer ring, the fixed inner ring is connected with the body, the rotating outer ring is rotationally connected with the fixed inner ring, and the rotating outer ring is also fixed on the rotating arm and meshed with the worm.

Preferably, the rotating assembly further includes a roller set arranged on the clamping portion, and the roller set includes a plurality of rolling members rotatably arranged on a same rotating shaft.

Preferably, the clamping portion includes an oblique stop surface and two side walls arranged at opposite sides of the stop surface, and the rotating shaft of the roller set is mounted on the two side walls.

Preferably, the cluster transfer robot further includes an emergency stop device arranged on the body, and the emergency stop device includes an emergency stop knob which is electrically connected to a power supply device of the transport robot.

The present disclosure further provides an intelligent parking lot, which includes the aforementioned cluster transfer robot. The cluster transfer robot includes a body, two clamping arms arranged at the bottom of the body, and a first driving mechanism arranged at the bottom of the body. The first driving mechanism includes a driving wheel configured for driving the transfer robot to move. The clamping arm includes a second driving mechanism and a rotating assembly connected to the second driving mechanism, the rotating assembly includes a rotating arm rotatably connected to the body and a supporting wheel arranged on the rotating arm for supporting the transfer robot, the rotating arm is provided with a clamping portion for clamping automobile tire, and two clamping portions of two rotating arms are arranged facing to each other to define a clamping space for the automobile tire when the two clamping portions are close to each other.

Preferably, the first driving mechanism further includes:
a mounting frame including a mounting plate and two supporting portions arranged on the mounting plate face to face, each supporting portion is equipped with the driving wheel, and the two driving wheels are arranged coaxially;
a driving assembly including a first drive motor arranged on the supporting portion and a first reducer connected to the output shaft of the first drive motor, the output shaft of the first reducer is connected to the driving wheel; and
a steering assembly including a second drive motor arranged on the mounting plate, a second reducer connected to the output shaft of the second drive motor, a driving gear connected to the output shaft of the second reducer, and a slewing bearing meshed with the driving gear; the inner ring of the slewing bearing is connected to the mounting plate, and the outer ring of the slewing bearing is connected to the body.

Preferably, the first driving mechanism further includes a plurality of vibration damping assemblies arranged between the supporting portion and the mounting plate, the vibration damping assembly includes a positioning rod and an elastic member sleeved on the positioning rod for supporting the mounting plate. One end of the positioning rod is fixedly connected to the supporting portion, and the other end is slidably connected to the mounting plate.

Preferably, the first driving mechanism further includes a plurality of guiding assemblies arranged between the supporting portion and the mounting plate, and the guiding assembly includes a guiding rod and a shaft sleeve sleeved on the guiding rod. The shaft sleeve is fixedly connected to the supporting portion, and one end of the guiding rod is fixedly connected to the mounting plate.

Preferably, the driving wheel is a steering wheel including a drive motor and a steering motor.

Preferably, the second driving mechanism includes a third drive motor and a worm gear driving member, the third drive motor is arranged on the body, and the worm of the worm gear driving member is connected with the output shaft of the third drive motor. The worm wheel of the worm gear driving member includes a fixed inner ring and a rotating outer ring, the fixed inner ring is connected with the body, the rotating outer ring is rotationally connected with the fixed inner ring, and the rotating outer ring is also fixed on the rotating arm and meshed with the worm.

Preferably, the rotating assembly further includes a roller set arranged on the clamping portion, and the roller set includes a plurality of rolling members rotatably arranged on a same rotating shaft.

Preferably, the clamping portion includes an oblique stop surface and two side walls arranged at opposite sides of the stop surface, and the rotating shaft of the roller set is mounted on the two side walls.

Preferably, the cluster transfer robot further includes an emergency stop device arranged on the body, and the emergency stop device includes an emergency stop knob which is electrically connected to a power supply device of the transport robot.

Beneficial Effect

The cluster transfer robot provided in the present disclosure employs four independently operating transfer robots to transfer vehicles. The four transfer robots may accurately park at the outside of each automobile tire based on a control of the navigation device and tire positioning device. Then, the two clamping arms of each transfer robot rotate close to the inner side of each automobile tire to clamp the vehicle from the ground. After the vehicle is clamped, the first driving mechanism controls the transfer robot to move to carry the vehicle to a designated position. The transfer robot provided in the disclosure may realize an automatic transfer of the vehicle by a movement control system of the transfer robot controlling a cooperative handling of the transfer robots. This kind of transfer robot is adapted to all kinds of parking lots, which do not need a structural remoulding of the parking lot, and either need an extra car board, thereby reduces the construction cost of the intelligent parking lots.

DETAILED DESCRIPTION OF THE EMBODIMENTS

Figure 1:
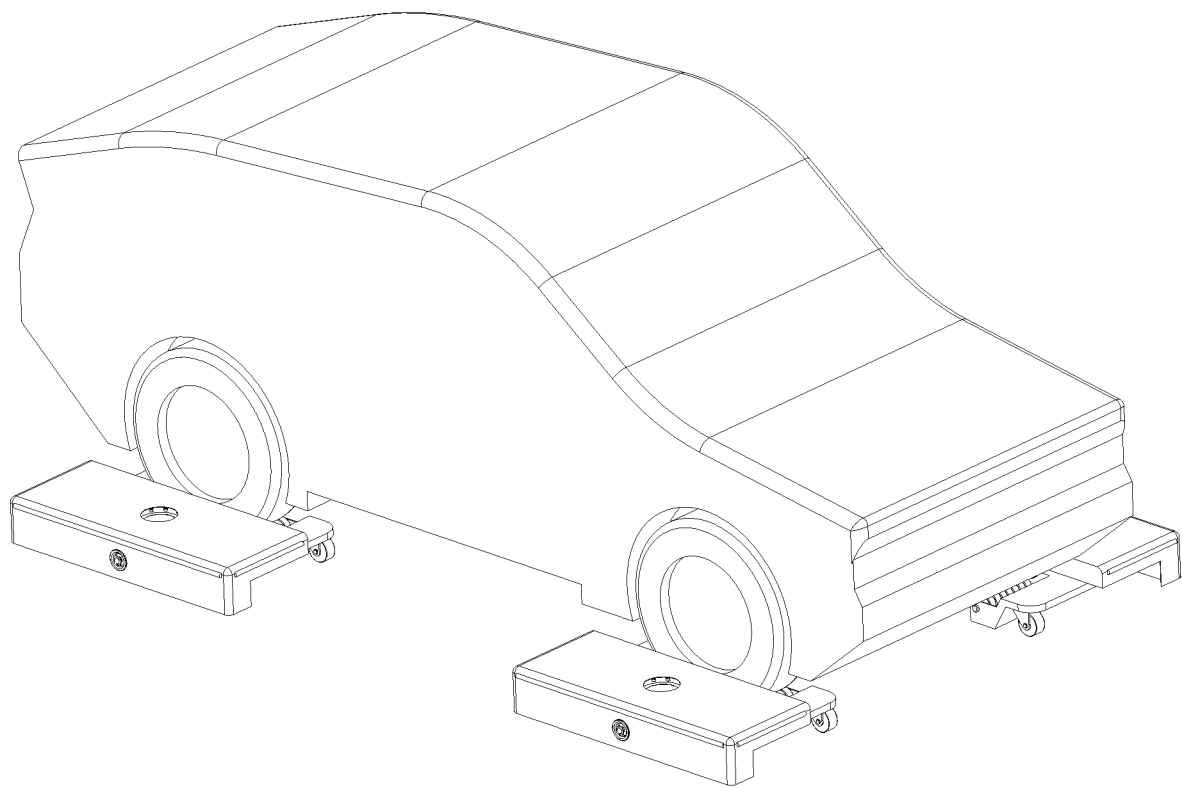
FIG. 1 is a schematic view of cluster transfer robots combined in use in accordance with an embodiment of the present disclosure.

The technical solutions of the embodiments of the present disclosure will be described in the following with reference to the accompanying drawings, wherein the same or similar reference numerals indicate the same or similar elements or elements with the same or similar functions. It should be understood that the embodiments described herein are only used to illustrate and explain the present disclosure, and are not to limit the present disclosure. All other embodiments obtained based on the embodiments by those of ordinary skill in the art without creative work shall fall within the protection scope of the present disclosure.

Referring to FIG. 1, in order to solve the above-mentioned technical problems, the present disclosure provides a cluster transfer robot. Two clamping arms 2 of each transfer robot of four transfer robots simultaneously rotate a certain angle towards the inner side of each automobile tire to apply an external force to the tires and clamp the tires, allowing each tire off the ground, so as to load the automobile on the four transfer robots. Each transfer robot receives a scheduling from a management and monitoring system, allowing the management and monitoring system to control the transfer robots working cooperatively, as such, a split transfer robot is realized. Compared with the traditional AGV, the cluster transfer robot has a more simple structure, and a lower manufacturing cost.

Figure 2:
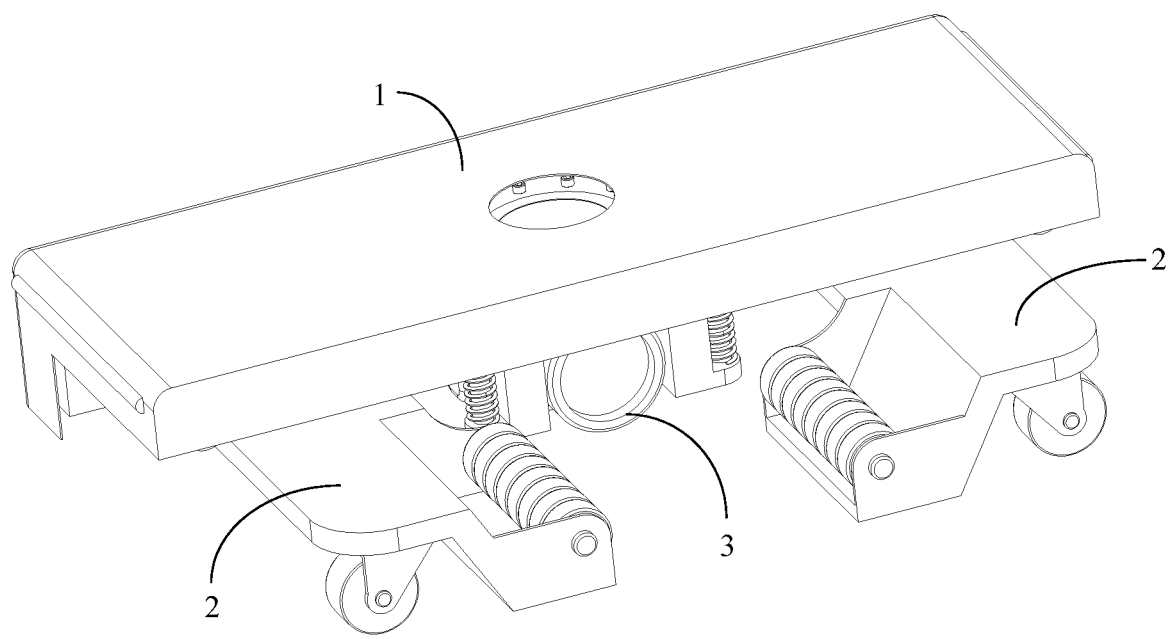
FIG. 2 is a structural schematic view of the cluster transfer robot in accordance with an embodiment of the present disclosure.
Figure 3:
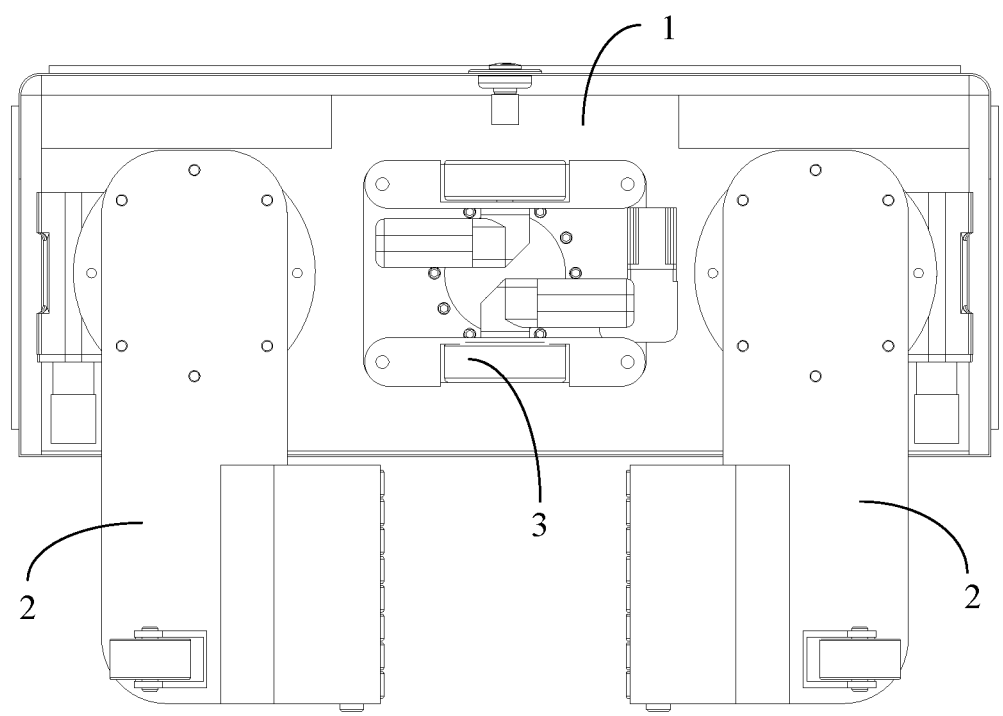
FIG. 3 is a bottom view of the cluster transfer robot shown in FIG. 2.

Referring to FIGS. 2 and 3, the cluster transfer robot includes a body 1, two clamping arms 2 arranged at the bottom of the body 1, and a first driving mechanism 3 arranged between the two clamping arms 2. A positioning and navigation device (not shown) and a power supply device (not shown) are provided inside the body 1. The positioning and navigation device is configured for path planning for the transfer robot, and the power supply device is configured to power the transfer robot to ensure a normal operation of the transfer robot. It is well known that, methods widely used for positioning and navigating the AGV include: electromagnetic guidance, which requires a special cable buried under the route of the AGV. Low-frequency sine wave current flows through the special cable, thereby generating magnetic field around the cable. The AGV is equipped with an electromagnetic induction sensor to detect the magnetic field around the cable and output a differential signal of magnetic field strength when the AGV walks along the route, allowing an on-board controller to control the AGV walks correctly based on the differential signal; optical control guidance, which works based on a ground color in contrast to the color of a paint strip. An infrared light source is configured on the AGV to illuminate the paint strip, and an optical detector is configured to detect various combinations of signals of the paint strip, so as to control the forward direction of the AGV; laser guidance, in which a plurality of laser/infrared beam reflectors are arranged at specific positions of the walking path of the AGV, and a laser scanning head configured on the AGV continuously scans the surrounding environment. If three or more reflectors are scanned by the laser scanning head, the AGV would be accurately positioned and orientated based on the coordinate values of the reflectors and the azimuth angle of the reflectors relative to the longitudinal axis of the AGV; and ultrasonic guidance, which is similar to the optical control guidance, using a reflection signal for positioning and orientation. The difference is that the optical control guidance needs specific reflectors for reflection, while the ultrasonic guidance utilizes the wall to reflect signal. The four positioning and navigation methods mentioned above are all applicable to the cluster transfer robot of the present disclosure, and those skilled in the art can select any one of the positioning and navigation methods according to their actual needs.

In an exemplary embodiment of the present disclosure, the first driving mechanism 3 controls the transfer robot to move and swerve according to a pre-determined path planned by a positioning and navigation device, so as to stop at a preset position. Before the transfer robot moves, a tire positioning device is needed to position the automobile tires to be transferred, so that the transfer robots can accurately park on both sides of each the automobile tire. The tire positioning device adopts positioning technique based on image recognition, in which a camera takes images of each tire of the vehicle to be transferred, to obtain the coordinate values of the images in the three-dimensional space by processing the obtained images. The camera may be arranged on the transport robot, or may be arranged at the position where the vehicle is stopped and taken.

Figure 4:
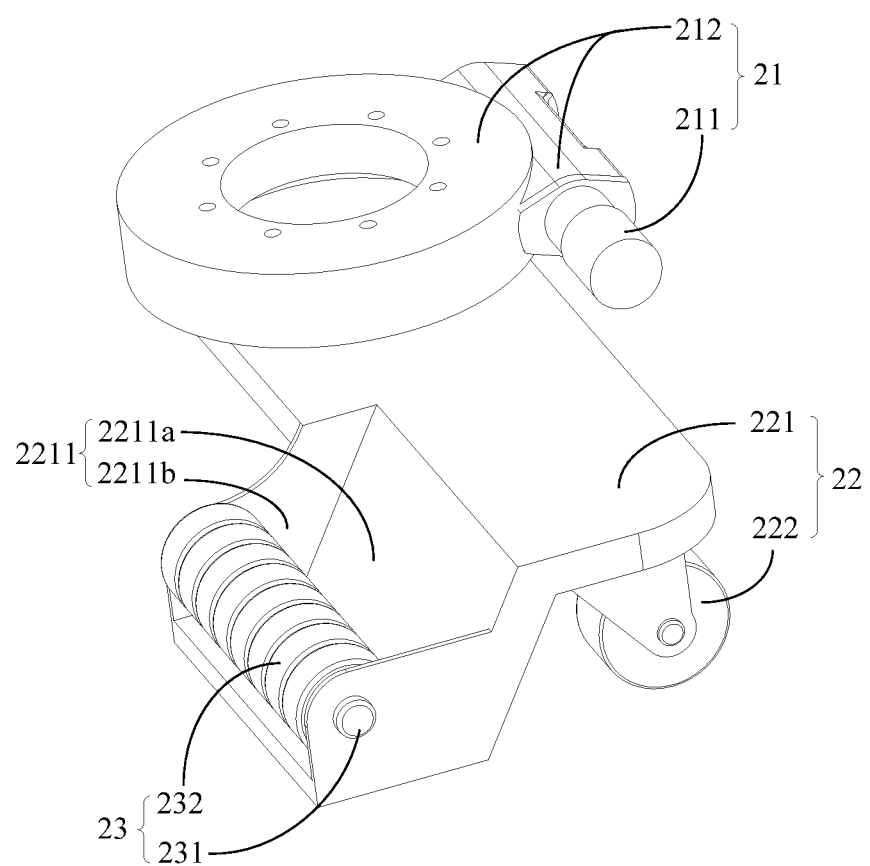
FIG. 4 is a structural schematic view of a clamping arm of the cluster transfer robot in accordance with an embodiment of the present disclosure.

Referring to FIG. 4, the clamping arm 2 includes a second driving mechanism 21 and a rotating assembly 22 connected to the second driving mechanism 21. The rotating assembly 22 includes a rotating arm 221 rotatably connected to the body 1, and a supporting wheel 222 arranged on the rotating arm 221 to support the transfer robot. The rotating arm 221 is provided with a clamping portion 2211 for clamping the automobile tire. The clamping portions 2211 of the two rotating arms 221 are arranged facing to each other to define a clamping space for the automobile tire. When the transfer robot do not carry a vehicle, the two clamping arms 2 are on a same line as the body 1; while when the transfer robot is to clamp the vehicle from the ground, the two clamping arms 2 rotate 90° around the body 1 at the same time to face each other and generate an inward force towards the tire, so as to lift the tire from the ground. The second driving mechanism 21 may be a worm gear transmission mechanism or a rack and pinion transmission mechanism. The worm gear transmission mechanism has the advantages of larger transmission ratio and carrying capacity. Considering the weight of the vehicle, the present disclosure selects the worm gear transmission mechanism. Specifically, the second driving mechanism 21 includes a third drive motor 211 and a worm gear driving member 212. The worm of the worm gear driving member 212 is connected with the output shaft of the third drive motor 211. The worm wheel of the worm gear driving member 212 includes a fixed inner ring and a rotating outer ring, the fixed inner ring is fixedly connected with the body 1 by screws, and the rotating outer ring is rotationally connected with the fixed inner ring. The rotating outer ring is also fixed on the rotating arm and meshed with the worm. The rotating outer ring of the worm wheel is drove by the third drive motor 211 to rotate to drive the rotating arm 221 rotating, thereby realizing a relative rotation of the two clamping arms 2.

In the embodiment described above, the rotating assembly 22 further includes a roller set 23 arranged on the clamping portion 2211. The roller set 23 includes a plurality of rolling members 232 rotatably arranged on a same rotating shaft 231. The rolling members 232 may rotate around the rotating shaft 231 under external force, as such, when the two clamping arms 2 clamp the automobile tire, sliding friction would generate between the clamping portion 2211 and the automobile tire, which effectively reduces the friction resistance. In an exemplary embodiment of the present disclosure, the rolling member 232 is preferably a bearing.

Referring to FIG. 4, in an optional embodiment of the present disclosure, the clamping portion 2211 includes an oblique stop surface 2211a and two side walls 2211b arranged at opposite sides of the stop surface 2211a. The aforementioned rotating shaft 231 of the roller set 23 is mounted on the two side walls 2211b. Further, as a preferred embodiment of the present disclosure, the stop surface 2211a, the two side walls 2211b, and a bottom surface cooperatively define a mounting space for arranging the roller set 23. The mounting space is constructed like a "garbage hopper" with openings at the front end and the top end.

Figure 5:
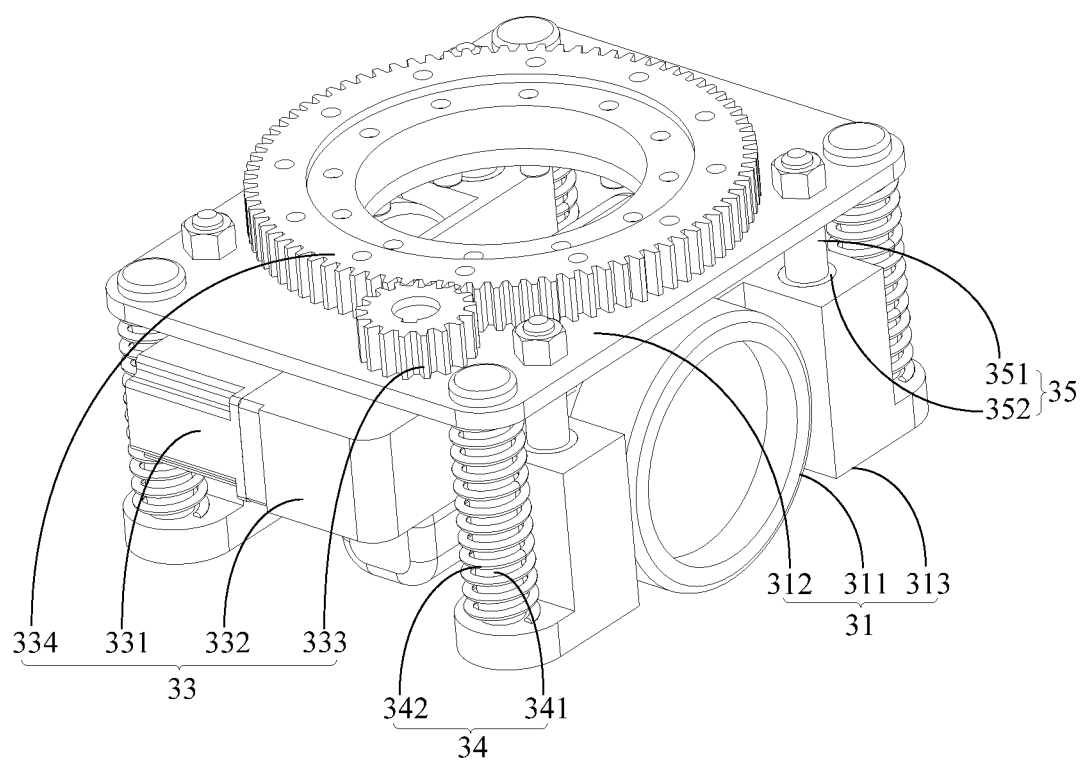
FIG. 5 is a structural schematic view of a first driving mechanism of the cluster transfer robot in accordance with an embodiment of the present disclosure.
Figure 6:
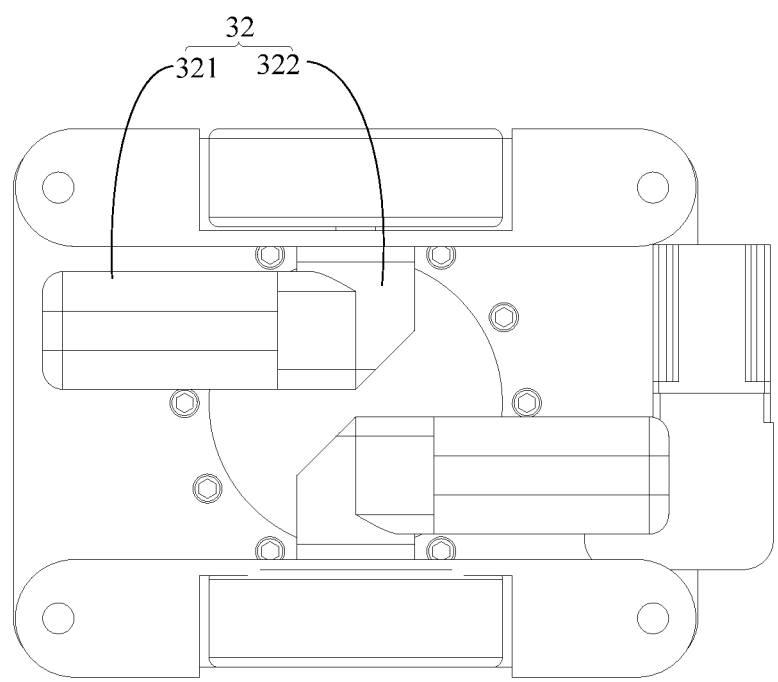
FIG. 6 is a bottom view of the first driving mechanism shown in FIG. 5.
Figure 7:
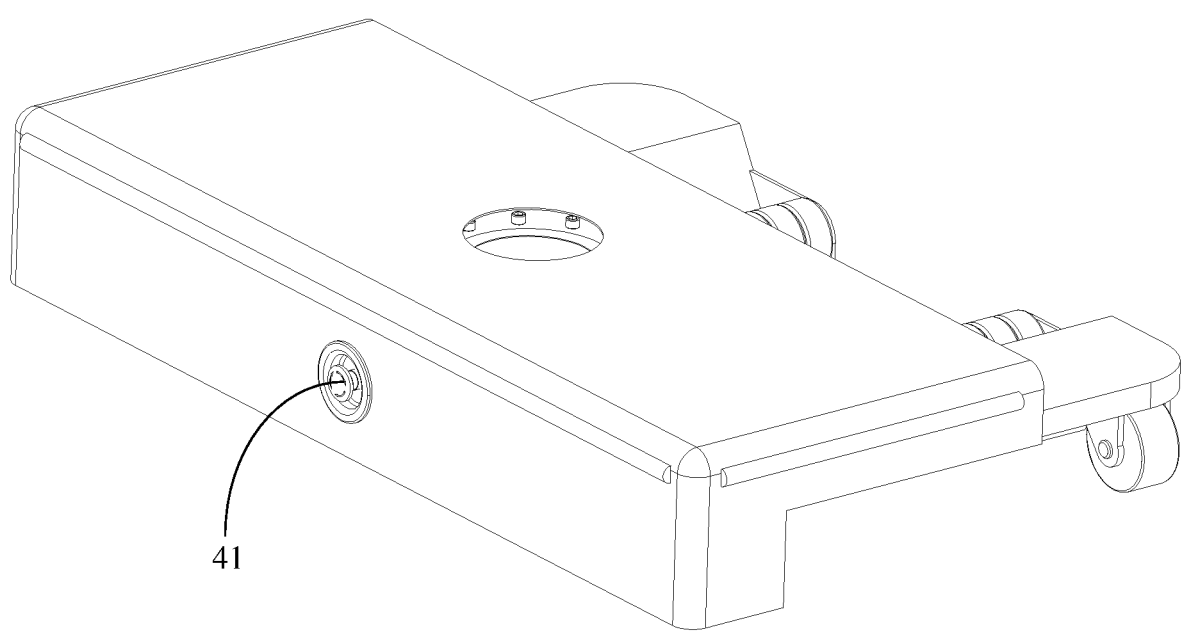
FIG. 7 is a structural schematic view of the cluster transfer robot from another perspective in accordance with an embodiment of the present disclosure.

In addition, the first driving mechanism 3 includes a mounting frame 31, a driving assembly 32, and a steering assembly 33. The mounting frame 31 specifically includes a mounting plate 312 and two supporting portions 313 arranged on the mounting plate 312 face to face. Each supporting portion 313 is equipped with a driving wheel 311, and the two driving wheels 311 are arranged coaxially. Referring to FIG. 5, in a specific embodiment of the present disclosure, the supporting portion 313 includes two "L"-shaped supporting plates integrally formed and a driving wheel mounting plate located between the two "L"-shaped supporting plates. The two "L"-shaped supporting plates are oppositely arranged. Referring to FIG. 6, the driving assembly 32 specifically includes a first drive motor 321 and a first reducer 322 both arranged on the supporting portion 313. The actuating end of the driving assembly 32 is connected to the driving wheel 311 to drive the driving wheel 311 to rotate, thereby control the transfer robot to perform linear movement. In addition, the steering assembly 33 is disposed on the mounting plate 312. The steering assembly 33 specifically includes a second drive motor 331, a second reducer 332 connected to the output shaft of the second drive motor 331, a driving gear 333 connected to the output shaft of the second reducer 332, and a slewing bearing 334 meshed with the driving gear 333. The inner ring of the slewing bearing 334 is connected to the mounting plate 312 by screws, and the outer ring of the slewing bearing 334 is connected to the bottom of the body 1. During the transfer robot moving, if the forward direction needs to be changed according to the determined route, the second drive motor 331 and the second reducer 332 drive the driving gear 333 to rotate; since the driving gear 333 meshes with the slewing bearing 334, the slewing bearing 334 is drove by the driving gear 333 to rotate, thereby driving the body 1 to rotate to realize a direction changing of the transfer robot. In case the rotation speed of the two driving wheels 311 is the same, the rotation direction is opposite, and the driving gear 333 does not rotate, due to an effect of differential speed, the transfer robot may integrally swerve; in case the rotation speed of the two driving wheels 311 is the same, the rotation direction is opposite, and the driving gear 333 rotates simultaneously, then the first driving mechanism 3 swerves while the body 1 keeping from swerving, which realizes a steering without adjusting the body of the transport robot.

Referring to FIG. 5, the first driving mechanism 3 further includes a plurality of vibration damping assemblies 34 longitudinally arranged between the supporting portion 313 and the mounting plate 312. The vibration damping assemblies 34 accelerate attenuation of vibration so as to improve the ride performance of the transfer robot. The vibration damping assembly 34 specifically includes a positioning rod 341 and an elastic member 342 sleeved on the positioning rod 341 for supporting the mounting plate 312. One end of the positioning rod 341 is fixedly connected to the supporting portion 313, and the other end is slidably connected to the mounting plate 312. In an exemplary embodiment of the present disclosure, the positioning rod 341 is a screw, and the elastic member 342 is a telescopic spring. The lower end of the screw is threadedly connected with the supporting portion 313, the upper end of the screw is penetrated into the mounting plate 312, and the mounting plate 312 moves up and down along a height direction of the screw. In addition, a plurality of guiding assemblies 35 are provided between the supporting portion 313 and the mounting plate 312 to ensure the mounting plate 312 moving up and down accurately. Referring to FIG. 5, the guiding assembly 35 specifically includes a guiding rod 351 and a shaft sleeve 352 sleeved on the guiding rod 351. The shaft sleeve 352 is fixedly connected to the supporting portion 313, and one end of the guiding rod 351 is fixedly connected to the mounting plate 312. The supporting portion 313 is provided with a guide hole adapted to the shaft sleeve 352, the shaft sleeve 352 is arranged in the guide hole, and the guide rod 351 is sleeved in the shaft sleeve 352. The shaft sleeve 352 enhances abrasive resistance of the guide rod 351, thereby extending the service life of the guide rod 351.

Figure 8:
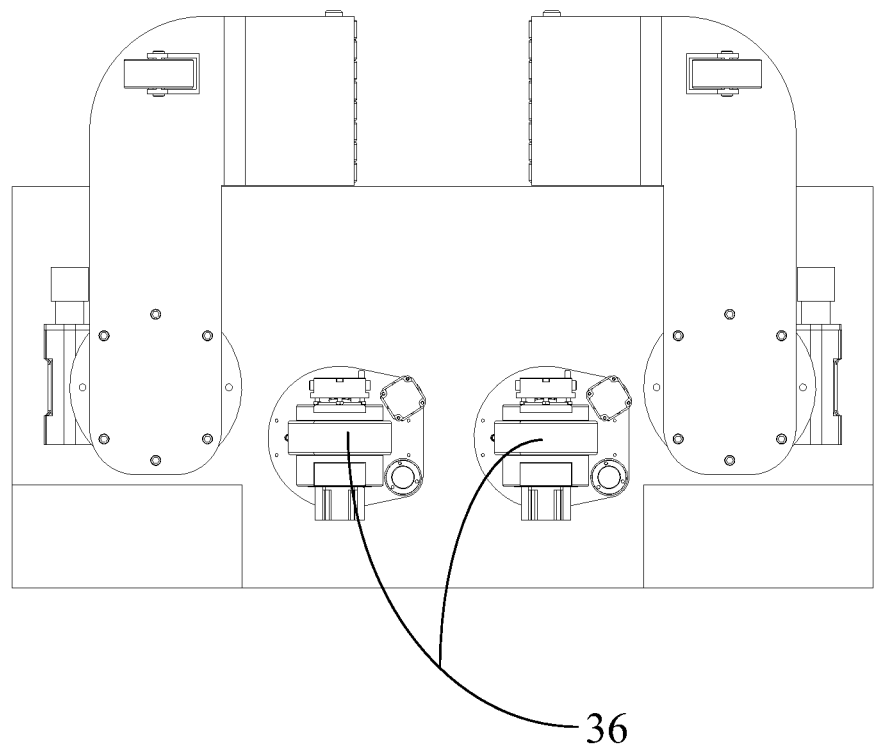
FIG. 8 is a bottom view of the cluster transfer robot in accordance with another embodiment of the present disclosure.

In a preferred embodiment of the present disclosure, the transfer robot can not only be controlled by differential control, but also by steering wheel. The steering wheel refers to a mechanical structure that integrates a drive motor, a steering motor, and a reducer. Compared with the traditional differential control, the steering wheel has the characteristics of high integration and strong adaptability. Specifically, referring to FIG. 8, the driving wheel 311 is a steering wheel 36 which includes a drive motor and a steering motor. In the embodiment of the present disclosure, only one steering wheel 36 is needed to control the forward movement of the transfer robot. The steering wheel 36 and two supporting wheels 222 cooperatively form a triangular support, which effectively improves the balance and stability of the transfer robot. It should be understood that, two or more steering wheels 36 may be used according to an actual need, and the two or more steering wheels 36 cooperate with the two supporting wheels 222 to realize an integral movement of the whole transfer robot.

Taking into account that during the operation of the cluster transfer robot, there may be situations where the transfer robot is out of control, the cluster transfer robot provided in the disclosure further includes an emergency stop device arranged on the body 1. The emergency stop device includes an emergency stop knob 41, which is electrically connected to a power supply device of the transport robot. The transport robot may be powered on or powered off by turning the emergency stop knob 41, that is, the transport robot can be started or stopped by turning the emergency stop knob 41. The emergency stop device provided in the disclosure may be used in some emergency situations to cut off the power supply of the transfer robot to stop the operation of the transfer robot.

The present disclosure further provides an intelligent parking lot, and the intelligent parking lot includes the cluster transfer robot described above. The specific structure of the cluster transfer robot may be referred to the aforementioned embodiments. Since the intelligent parking lot adopts all the technical solutions of the aforementioned embodiments, it has at least the advantages described in the aforementioned embodiments, which does not be repeated here.

What has been described above are only preferred embodiments of the present disclosure, and are not considering to limit the protection scope of the present disclosure. And any equivalent changes made in structures with regard to the description and drawings of the present disclosure, directly or indirectly used in other related technical fields, are all included in the protection scope of the present disclosure.

What is claimed is:

1. A cluster transfer robot, configured for transferring vehicles in parking lots, wherein the cluster transfer robot comprises a body, two clamping arms arranged at the bottom of the body, and a first driving mechanism arranged at the bottom of the body; the first driving mechanism comprises a driving wheel configured for driving the transfer robot to move;

each one of the two clamping arms comprises a second driving mechanism and a rotating assembly connected to the second driving mechanism, the rotating assembly comprises a rotating arm rotatably connected to the body and a supporting wheel arranged on the rotating arm for supporting the transfer robot, the rotating arm is provided with a clamping portion for clamping automobile tire, and two clamping portions of two rotating arms are arranged facing to each other to define a clamping space for the automobile tire when the two clamping portions are close to each other;

wherein the first driving mechanism further comprises:

a mounting frame comprising a mounting plate and two supporting portions arranged on the mounting plate face to face, each supporting portion being equipped with the driving wheel, and the two driving wheels being arranged coaxially;

a driving assembly comprising a first drive motor arranged on the supporting portion and a first reducer connected to the output shaft of the first drive motor, the output shaft of the first reducer being connected to the driving wheel; and a steering assembly comprising a second drive motor arranged on the mounting plate, a second reducer connected to the output shaft of the second drive motor, a driving gear connected to the output shaft of the second reducer, and a slewing bearing meshed with the driving gear; an inner ring of the slewing bearing being connected to the mounting plate, and an outer ring of the slewing bearing being connected to the body.

2. The cluster transfer robot according to claim 1, wherein the first driving mechanism further comprises a plurality of vibration damping assemblies arranged between the supporting portion and the mounting plate, each one of the plurality of vibration damping assemblies comprises a positioning rod and an elastic member sleeved on the positioning rod for supporting the mounting plate; one end of the positioning rod is fixedly connected to the supporting portion, and the other end is slidably connected to the mounting plate.

3. The cluster transfer robot according to claim 2, wherein the first driving mechanism further comprises a plurality of guiding assemblies arranged between the supporting portion and the mounting plate, and each one of the plurality of guiding assemblies comprises a guiding rod and a shaft sleeve sleeved on the guiding rod; the shaft sleeve is fixedly connected to the supporting portion, and one end of the guiding rod is fixedly connected to the mounting plate.

4. The cluster transfer robot according to claim 1, wherein the driving wheel is a steering wheel comprising a drive motor and a steering motor.

5. The cluster transfer robot according to claim 1, wherein the second driving mechanism comprises a third drive motor and a worm gear driving member, the third drive motor is arranged on the body, the worm of the worm gear driving member is connected with the output shaft of the third drive motor; the worm wheel of the worm gear driving member comprises a fixed inner ring and a rotating outer ring, the fixed inner ring is connected with the body, the rotating outer ring is rotationally connected with the fixed inner ring, and the rotating outer ring is also fixed on the rotating arm and meshed with the worm.

6. The cluster transfer robot according to claim 1, wherein the rotating assembly further comprises a roller set arranged on the clamping portion, and the roller set comprises a plurality of rolling members rotatably arranged on a same rotating shaft.

7. The cluster transfer robot according to claim 6, wherein the clamping portion comprises an oblique stop surface and two side walls arranged at opposite sides of the stop surface, and the rotating shaft of the roller set is mounted on the two side walls.

8. The cluster transfer robot according to claim 1, wherein the cluster transfer robot further comprises an emergency stop device arranged on the body, and the emergency stop device comprises an emergency stop knob which is electrically connected to a power supply device of the transport robot.

9. An intelligent parking lot, wherein the intelligent parking lot comprises a cluster transfer robot, the cluster transfer robot comprises a body, two clamping arms arranged at the bottom of the body, and a first driving mechanism arranged at the bottom of the body; the first driving mechanism comprises a driving wheel configured for driving the transfer robot to move;

each one of the two clamping arms comprises a second driving mechanism and a rotating assembly connected to the second driving mechanism, the rotating assembly comprises a rotating arm rotatably connected to the body and a supporting wheel arranged on the rotating arm for supporting the transfer robot, the rotating arm is provided with a clamping portion for clamping automobile tire, and two clamping portions of two rotating arms are arranged facing to each other to define a clamping space for the automobile tire when the two clamping portions are close to each other;

wherein the first driving mechanism further comprises:

a mounting frame comprising a mounting plate and two supporting portions arranged on the mounting plate face to face, each supporting portion being equipped with the driving wheel, and the two driving wheels being arranged coaxially;

a driving assembly comprising a first drive motor arranged on the supporting portion and a first reducer connected to the output shaft of the first drive motor, the output shaft of the first reducer being connected to the driving wheel; and a steering assembly comprising a second drive motor arranged on the mounting plate, a second reducer connected to the output shaft of the second drive motor, a driving gear connected to the output shaft of the second reducer, and a slewing bearing meshed with the driving gear; the inner ring of the slewing bearing being connected to the mounting plate, and the outer ring of the slewing bearing being connected to the body.

10. The intelligent parking lot according to claim 9, wherein the first driving mechanism further comprises a plurality of vibration damping assemblies arranged between the supporting portion and the mounting plate, each one of the plurality of vibration damping assemblies comprises a positioning rod and an elastic member sleeved on the positioning rod for supporting the mounting plate; one end of the positioning rod is fixedly connected to the supporting portion, and the other end is slidably connected to the mounting plate.

11. The intelligent parking lot according to claim 10, wherein the first driving mechanism further comprises a plurality of guiding assemblies arranged between the supporting portion and the mounting plate, and each one of the plurality of guiding assemblies comprises a guiding rod and a shaft sleeve sleeved on the guiding rod; the shaft sleeve is fixedly connected to the supporting portion, and one end of the guiding rod is fixedly connected to the mounting plate.

12. The intelligent parking lot according to claim 9, wherein the driving wheel is a steering wheel comprising a drive motor and a steering motor.

13. The intelligent parking lot according to claim 9, wherein the second driving mechanism comprises a third drive motor and a worm gear driving member, the third drive motor is arranged on the body, the worm of the worm gear driving member is connected with the output shaft of the third drive motor; the worm wheel of the worm gear driving member comprises a fixed inner ring and a rotating outer ring, the fixed inner ring is connected with the body, the rotating outer ring is rotationally connected with the fixed inner ring, and the rotating outer ring is also fixed on the rotating arm and meshed with the worm.

14. The intelligent parking lot according to claim 9, wherein the rotating assembly further comprises a roller set arranged on the clamping portion, and the roller set comprises a plurality of rolling members rotatably arranged on a same rotating shaft.

15. The intelligent parking lot according to claim 14, wherein the clamping portion comprises an oblique stop surface and two side walls arranged at opposite sides of the stop surface, and the rotating shaft of the roller set is mounted on the two side walls.

16. The intelligent parking lot according to claim 9, wherein the cluster transfer robot further comprises an emergency stop device arranged on the body, and the emergency stop device comprises an emergency stop knob which is electrically connected to a power supply device of the transport robot.

* * * * *